(12) United States Patent
Hulsman et al.

(10) Patent No.: US 8,091,332 B2
(45) Date of Patent: Jan. 10, 2012

(54) MOWER DECK WITH AIR INLETS

(75) Inventors: Bert Hulsman, Kruissteenweg (NL); Bertjan Bieleman, Morslaan (NL)

(73) Assignee: John Deere Enschede B.V., Enschede Ov (NL)

( * ) Notice: Subject to any disclaimer, the term of this patent is extended or adjusted under 35 U.S.C. 154(b) by 0 days.

(21) Appl. No.: 11/861,807

(22) Filed: Sep. 26, 2007

(65) Prior Publication Data

US 2009/0077941 A1    Mar. 26, 2009

(51) Int. Cl.
  *A01D 67/00*    (2006.01)
(52) U.S. Cl. ...................... 56/320.1; 56/320.2
(58) Field of Classification Search ............... 56/13.3, 56/13.4, 255, 320.1, 320.2
  See application file for complete search history.

(56) References Cited

U.S. PATENT DOCUMENTS

| | | | |
|---|---|---|---|
| 1,899,564 A * | 2/1933 | Frey | 56/13.4 |
| 2,888,796 A * | 6/1959 | Denney | 56/13.4 |
| 2,983,096 A * | 5/1961 | Phelps | 56/255 |
| 3,000,165 A | 9/1961 | Lill | |
| 3,220,170 A | 11/1965 | Smith et al. | |
| 3,795,095 A | 3/1974 | Erickson et al. | |
| 4,318,268 A * | 3/1982 | Szymanis | 56/255 |
| 4,407,112 A * | 10/1983 | Shepherd et al. | 56/13.4 |
| 4,741,148 A * | 5/1988 | Ekas et al. | 56/12.9 |
| 4,856,265 A | 8/1989 | Wolf | |
| 5,035,108 A | 7/1991 | Meyer et al. | |
| 5,191,756 A * | 3/1993 | Kuhn | 56/17.5 |
| 5,210,998 A * | 5/1993 | Hojo et al. | 56/255 |
| 5,214,906 A * | 6/1993 | Saki et al. | 56/320.2 |
| 5,499,495 A | 3/1996 | Heisman et al. | |
| 5,609,011 A * | 3/1997 | Kuhn et al. | 56/17.5 |
| 5,761,891 A * | 6/1998 | Ferrari | 56/6 |
| 5,765,346 A | 6/1998 | Benter et al. | |
| 6,065,276 A | 5/2000 | Hohnl et al. | |
| 6,484,481 B1 * | 11/2002 | Langworthy et al. | 56/6 |
| 6,484,486 B2 | 11/2002 | Nagai et al. | |
| 6,681,553 B2 | 1/2004 | Ferree et al. | |
| 6,782,684 B2 | 8/2004 | Buss et al. | |
| 6,862,874 B2 * | 3/2005 | Seegert | 56/202 |
| 7,065,946 B2 * | 6/2006 | Boeck et al. | 56/320.1 |
| 7,146,791 B2 * | 12/2006 | Benway et al. | 56/320.2 |
| 2002/0104301 A1 * | 8/2002 | Langworthy et al. | 56/320.2 |

FOREIGN PATENT DOCUMENTS

EP    1300063    5/2004
JP    2005 32 3549    11/2005

* cited by examiner

*Primary Examiner* — Thomas Will
*Assistant Examiner* — Mai Nguyen

(57) ABSTRACT

A mower deck has a pair of adjacent cylindrical cutting chambers with rotary cutting blades. Each cutting chamber has a skirt with an air inlet next to a rear discharge chute centrally positioned between the two cutting chambers. A horizontal shield is over each air inlet.

11 Claims, 3 Drawing Sheets

MOWER DECK WITH AIR INLETS

FIELD OF THE INVENTION

This invention relates to mower decks and, more specifically, to mower decks having two blades in adjacent cutting chambers under a mower deck, and rear discharge from the mower deck to a grass clippings collection container.

BACKGROUND OF THE INVENTION

To provide a high quality cut at the desired cutting height, mower decks having a pair of rotary cutting blades have been designed to lift the grass under the mower deck. Mower blades may be shaped to lift the grass as they rotate at high speed. The blades may be enclosed within depending cylindrical cutting chambers having skirts or perimeter walls that are configured to contain the air stream generated by the rotating blades and assist in lifting the grass to cut it at the desired height. Discharge chutes may discharge the grass clippings from the cutting chambers into a collection container. A sufficiently strong air stream is needed to lift the grass to the desired cutting height, and discharge the grass out the rear of the mower deck into the collection container.

To lift heavy grass clippings, and avoid or reduce clogging, blowers or fans may be mounted on the mower deck or in a discharge chute to the collection container. However, supplemental air handling devices have disadvantages including power requirements, noise, and cost. As a result, it often is preferable to discharge grass clippings from the mower deck to a collection container using only air pressure provided by the cutting blades and surfaces under the deck.

Mower deck cutting chambers have downwardly extending perimeter skirts or baffles which extend below the horizontal plane of the rotary cutting blades during mowing. The skirts or baffles may be intended to optimize air flow in each cutting chamber, as well as between the cutting chambers and/or through a rear discharge opening. Additionally, some mower decks may be designed to provide an air flow into the cutting chambers. For example, U.S. Pat. No. 6,681,553 entitled Mowing Cutting Chamber relates to a cutting chamber for a mower deck blade having skirt members of differing lengths to provide for a lifting air stream at the front of the chamber and a discharging air stream at the rear of the chamber. U.S. Pat. No. 3,795,095 entitled Vented Rotary Lawn Mower relates to a mower deck having a plurality of air vents which permit air to enter the top of the deck and pass downwardly to assist air flow.

At lower cutting heights, the perimeter skirts or baffles around the cutting chambers under a mower deck may be relatively close to the ground. Their proximity to the ground can reduce and restrict the flow of air into the cutting chambers. Reduced and restricted air flow into the cutting chambers can reduce the lift needed to cut grass at a desired height, and can reduce the air flow needed to propel the clippings into the collection container. As a result, fewer grass clippings may be discharged from the mower deck into the container.

Additionally, air flow from each rotary cutting blade may blow over grass near the center of the mower deck. As a result, the pair of blades may not cut the grass at or near the middle of the deck to the desired height, especially at lower cutting heights. To avoid leaving a strip or swath of longer or uncut grass at the middle of the deck, some mower decks may position one of the cutting blades forward of the other(s). Other mower decks may use timing mechanisms so that the blades can overlap. For example, U.S. Pat. No. 6,065,276 entitled Mulching Mower Deck relates to a mower deck with overlapping blades and a flow divider extending down from the top wall, positioned generally above the location where the blade paths overlap.

A mower deck is needed that can provide rear discharge of grass clippings into a collection container without a supplemental fan or blower. A mower deck is needed that can avoid leaving a swath or strip of long or uncut grass in the middle of the deck between the cutting blades, with minimal cost and complexity. A mower deck is needed that can mow and collect grass at lower cut heights.

SUMMARY OF THE INVENTION

A mower deck has air inlets on each side of a discharge chute at the rear of the mower deck, to enhance air flow, lift the grass for cutting, and help collect the grass clippings at lower cutting heights. A rib in the center of the mower deck improves cut quality by preventing air flow from each blade blowing over the grass.

DESCRIPTION OF THE PREFERRED EMBODIMENT

Figure 1:
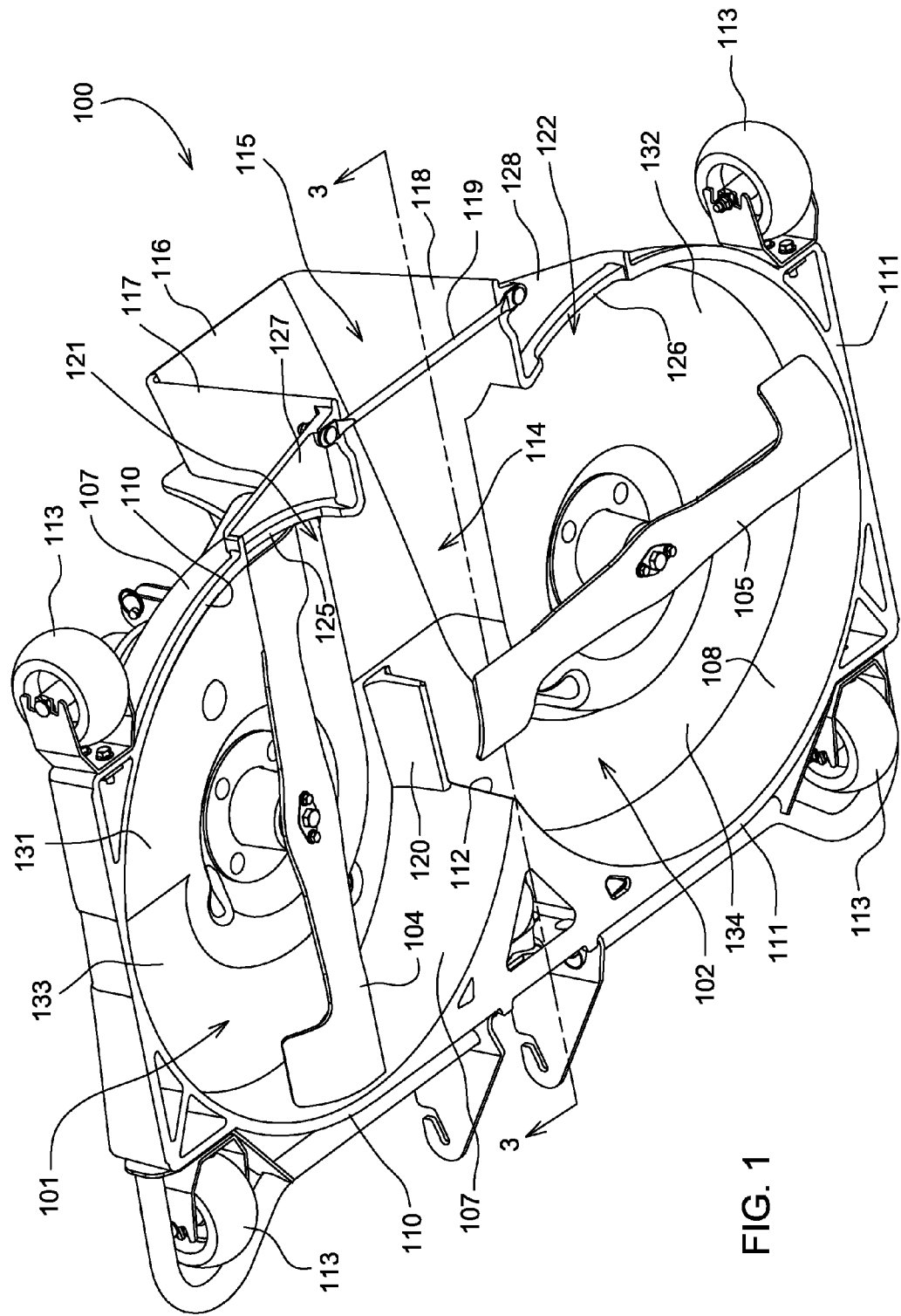
FIG. 1 is a bottom perspective view of a mower deck with air inlets according to one embodiment of the invention.
Figure 2:
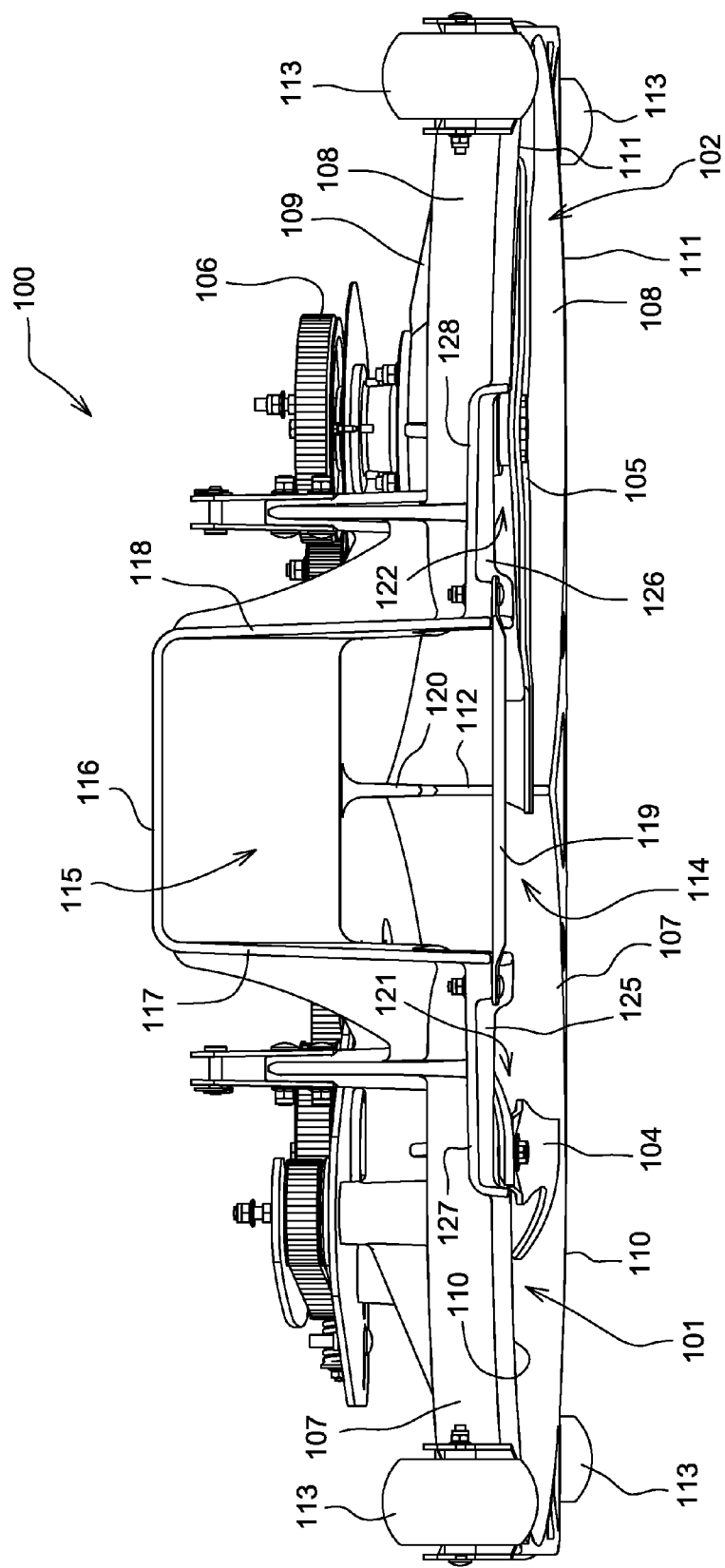
FIG. 2 is a rear perspective view of a mower deck with air inlets, tilted forward slightly, according to one embodiment of the invention.
Figure 3:
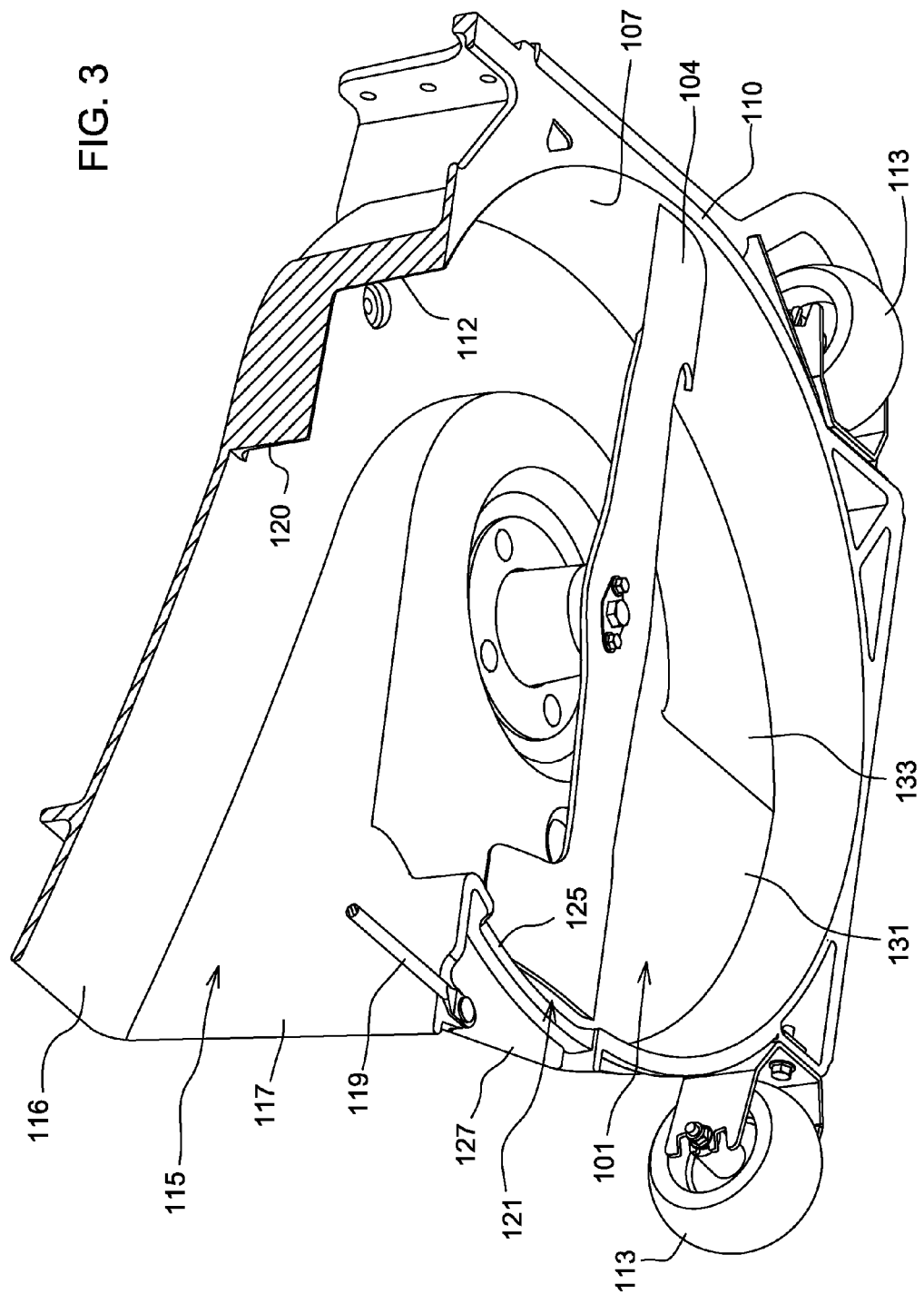
FIG. 3 is a rear perspective view, in cross section along section line 3-3 of FIG. 1, of a mower deck with air inlets.

In one embodiment of the invention, as shown in FIGS. 1-3, mower deck 100 includes two adjacent cutting chambers 101, 102. Each cutting chamber is cylindrical in shape, and surrounds and covers a rotary cutting blade 104, 105. Each rotary cutting blade may have a wing or lift feature to help provide an upward air flow in the cutting chamber. The rotary cutting blades may be mounted and secured to the lower ends of generally vertically oriented spindles for rotation on vertical axes. The spindles may be turned by one or more belts 106 wound around pulleys attached to the upper ends of the spindles. Belts 106 may be ribbed to engage teeth on the outer circumferences of the pulleys to time the blade rotation, and so that the cutting path of each blade may overlap the other blade without interference.

In one embodiment, each cylindrical cutting chamber is at least partially enclosed by a baffle or skirt 107, 108 extending downwardly around the outer periphery of the cutting chamber from the top panel 109 of the mower deck. The bottom edge 110, 111 of each baffle or skirt extends down below the horizontal plane of each rotary cutting blade 104, 105. At the center of the deck, where the left and right cutting chambers overlap, the baffles or skirts join and terminate at junction 112. Wheels 113 may be attached to the baffle or skirt, and/or periphery of the mower deck, to help prevent or minimize damage or scalping of the ground surface or turf when mowing.

In one embodiment, each cutting chamber 101, 102 includes a generally horizontal portion 131, 132, and also an upwardly sloping portion 133, 134 under top panel 109. The upwardly sloping portion of each cutting chamber may provide an air flow path leading to rear discharge chute 115. Rear discharge chute 115 extends rearwardly from the center of mower deck 100. At least a portion of rear discharge chute 115 is above part of each cutting chamber and opening 114 between the two cutting chambers. As a result, the rear discharge chute can discharge grass clippings from both cutting chambers behind the mower deck or into a collection container (not shown).

In one embodiment, rear discharge chute 115 may include a sloped top wall 116, and left and right walls 117, 118. The sloped top wall extends upwardly and rearwardly from the top panel 109 of the mower deck near the center of the mower deck toward a generally rectangular discharge opening behind the cutting chambers at the rear of the mower deck. Grass clippings from each cutting chamber are propelled upwardly and rearwardly through the discharge chute. Left and right walls 117, 118 extend rearwardly from the center to the rear of the mower deck. Rod 119 may connect the left and right walls of the discharge chute at or near their lower edges.

In one embodiment of the invention, rib 120 is centrally positioned in opening 114 between left and right cutting chambers 101, 102. The rib extends rearwardly from junction 112 between the left and right baffles or skirts. Preferably, rib 120 extends rearwardly between about 3 cm and about 10 cm, or less than about half the length of opening 114 between the two cutting chambers. Rib 120 extends down from top panel 109 of the mower deck and from upper wall 116 of discharge chute 115, and is above the horizontal plane of cutting blades 104, 105. Rib 120 improves cut quality by preventing or reducing air flow from each blade having a tendency to blow over grass. Additionally, rib 120 helps the blades cut grass in the center of the mower deck.

In one embodiment, mower deck 100 includes air inlets 121, 122 at the rear of cutting chambers 101, 102. Air inlets 121, 122 are positioned adjacent the left and right walls 117, 118 on each side of discharge chute 116. The lower edges 125, 126 of each air inlet are less than about 1 cm above the horizontal plane of the cutting blade. The length of each air inlet is between about 3 cm and about 8 cm around the circumference of each cutting chamber.

Additionally, in one embodiment, horizontal shields 127, 128 extend rearwardly from the cylindrical cutting chambers over air inlets 121, 122. The horizontal shields enhance safe operation of the mower deck by blocking access to the air inlets and reducing the risk that an operator's foot or debris will enter the air inlets. Each horizontal shield 127, 128 may be positioned above the lower edge 125, 126 of the air inlet, and below the top panel 109 of the mower deck. Each horizontal shield may extend rearwardly over each air inlet between about 1 cm and about 5 cm.

Having described the preferred embodiment, it will become apparent that various modifications can be made without departing from the scope of the invention as defined in the accompanying claims.

The invention claimed is:

1. A mower deck comprising:
   a pair of adjacent cylindrical cutting chambers with rotary cutting blades, each cutting chamber having a skirt and an opening between the two cutting chambers; each rotary cutting blade rotating on a generally vertical spindle and cutting along a generally horizontal plane;
   each cutting chamber having an upwardly sloping portion into a rear discharge chute having a rearwardly facing opening through the skirts and centrally positioned between the two cutting chambers; and
   a pair of rearwardly facing air inlets adjacent the rearwardly facing opening of the discharge chute to provide an air flow into the cutting chambers through the skirts on each side of the rear discharge chute; each inlet being at least partially above a lower edge of the rear discharge chute.

2. The mower deck of claim 1 further comprising a horizontal shield extending rearwardly from the skirt over each air inlet.

3. The mower deck of claim 1 further comprising a rib extending rearwardly for less than half of the opening between the two cutting chambers.

4. The mower deck of claim 1 wherein the rotary cutting blades overlap and are timed using a ribbed belt.

5. The mower deck of claim 1 wherein rear discharge chute slopes upwardly behind the mower deck.

6. A mower deck comprising:
   a pair of cutting chambers having timed rotary cutting blades, part of each cutting chamber having an upwardly sloping surface to a rear discharge chute having a rear opening defined by a sloped top wall extending upwardly and rearwardly between the pair of cutting chambers, and a left wall and a right wall extending downwardly from the sloped top wall;
   a skirt around at least part of each cutting chamber; and
   a rearwardly facing air inlet in the lower edge of each skirt adjacent the rear opening of the rear discharge chute and at least partially above the left wall and the right wall of the rear discharge chute.

7. The mower deck of claim 6 further comprising a rib extending rearwardly for less than half of the opening between the pair of cutting chambers.

8. The mower deck of claim 6 further comprising a horizontal shield over each air inlet that extends rearwardly from each skirt.

9. The mower deck of claim 6 wherein the rear discharge chute is centrally positioned between the pair of cutting chambers.

10. A mower deck comprising:
    a top panel over a left cutting chamber and a right cutting chamber, each cutting chamber having a skirt extending downwardly from the top panel and surrounding at least a portion of the cutting chamber;
    an opening between the left and right cutting chambers;
    a discharge chute above the opening and having a left wall, a right wall, and a top wall sloping upwardly and rearwardly through the skirts of the left and right cutting chambers;
    a rearwardly facing air inlet through each skirt adjacent the discharge chute opening; each inlet being at least partially above the left wall and the right wall of the rear discharge chute; and
    a horizontal shield over each air inlet and extending rearwardly from each skirt;
    a rotary cutting blade in each cutting chamber having a lift feature adjacent the air inlet to provide an upward air flow from the air inlet around each cutting chamber to the discharge chute.

11. The mower deck of claim 10 further comprising a rib extending downwardly from the top panel and rearwardly for less than half of the opening between the left and right cutting chambers.

* * * * *